(12) United States Patent
McClendon

(10) Patent No.: US 9,349,019 B2
(45) Date of Patent: May 24, 2016

(54) SYSTEM AND METHOD FOR ASSOCIATING TAGS WITH ONLINE CONTENT

(71) Applicant: Google Inc., Mountain View, CA (US)

(72) Inventor: Brian A. McClendon, Portola Valley, CA (US)

(73) Assignee: Google Inc., Mountain View, CA (US)

( * ) Notice: Subject to any disclaimer, the term of this patent is extended or adjusted under 35 U.S.C. 154(b) by 267 days.

(21) Appl. No.: 14/043,133

(22) Filed: Oct. 1, 2013

(65) Prior Publication Data

US 2015/0169888 A1    Jun. 18, 2015

(51) Int. Cl.
*G06F 7/02* (2006.01)
*G06F 17/30* (2006.01)
*G06F 21/62* (2013.01)

(52) U.S. Cl.
CPC ...... *G06F 21/6218* (2013.01); *G06F 17/30038* (2013.01); *G06F 17/30268* (2013.01); *G06F 17/30613* (2013.01)

(58) Field of Classification Search
CPC ............... G06F 21/6218; G06F 21/62; G06F 17/30038; G06F 17/30268; G06F 17/30752; G06F 17/3082; G06F 17/3089; G06F 17/30613
See application file for complete search history.

(56) References Cited

U.S. PATENT DOCUMENTS

| | | | |
|---|---|---|---|
| 7,640,582 B2 * | 12/2009 | Beck | H04L 63/12 707/999.001 |
| 7,730,094 B2 | 6/2010 | Kaler et al. | |
| 8,306,977 B1 | 11/2012 | Gildfind | |
| 9,075,788 B1 * | 7/2015 | Roth et al. | |
| 2008/0222108 A1 * | 9/2008 | Prahlad et al. | 707/3 |
| 2009/0049047 A1 | 2/2009 | Battepati et al. | |
| 2009/0119370 A1 | 5/2009 | Stern et al. | |
| 2012/0246705 A1 | 9/2012 | Brown et al. | |
| 2013/0347056 A1 * | 12/2013 | Kuhlman et al. | 726/1 |
| 2014/0207861 A1 * | 7/2014 | Brandwine | H04L 51/32 709/204 |

* cited by examiner

*Primary Examiner* — Bruce Moser
(74) *Attorney, Agent, or Firm* — Dority & Manning, P.A.

(57) ABSTRACT

In one aspect, a computer-implemented method of associating tags with online content may generally include receiving, by one or more computing devices, a tag request from a user to associate a tag with a content object, classifying the tag as a controlled tag, accessing an access control list associated with the controlled tag, determining whether the user is permitted access to the controlled tag based on the access control list, associating the tag with the content object when the access control list permits access to the controlled tag, identifying a moderator for a tag group associated with the controlled tag and providing a moderator feed to the moderator of the content object associated with the controlled tag for approval or rejection of the controlled tag.

16 Claims, 5 Drawing Sheets

SYSTEM AND METHOD FOR ASSOCIATING TAGS WITH ONLINE CONTENT

FIELD

The present subject matter relates generally to tagging online content and, more particularly, to an access control list (ACL) based system and method for associating tags with online content.

BACKGROUND

Various hosting services or content platforms are known that allow for the sharing of online content, such as audiovisual content (e.g., images and videos) and/or various other forms of content. To determine the nature of and/or to organize online content, typical approaches include community "tagging" that allows users in a broad community to associate labels or "tags" (e.g., textual phrases) with online content. For instance, an image of a basketball game may be tagged with the names of the teams playing or the names of the players depicted in the image. However, unrestricted community tagging of online content is often incomplete and inaccurate. For instance, online content may be tagged with commentary that is too generic or completely irrelevant. As a result, it is often difficult to provide a trustworthy source of tagged online content.

SUMMARY

Aspects and advantages of embodiments of the present subject matter will be set forth in part in the following description, or may be obvious from the description, or may be learned through practice of the embodiments.

In one aspect, the present subject matter is directed to a computer-implemented method of associating tags with online content. The method may generally include receiving, by one or more computing devices, a tag request from a user to associate a tag with a content object, classifying the tag as a controlled tag, accessing an access control list associated with the controlled tag, determining whether the user is permitted access to the controlled tag based on the access control list, associating the tag with the content object when the access control list permits access to the controlled tag, identifying a moderator for a tag group associated with the controlled tag and providing a moderator feed to the moderator of the content object associated with the controlled tag.

Other exemplary aspects of the present disclosure are directed to systems, apparatus, non-transitory computer-readable media, user interfaces and devices for associating tags with online content.

These and other features, aspects and advantages of the various embodiments will become better understood with reference to the following description and appended claims. The accompanying drawings, which are incorporated in and constitute a part of this specification, illustrate embodiments of the invention and, together with the description, serve to explain the related principles.

BRIEF DESCRIPTION OF THE DRAWINGS

Detailed discussion of embodiments directed to one of ordinary skill in the art, are set forth in the specification, which makes reference to the appended figures, in which.

DETAILED DESCRIPTION

Figure 1:
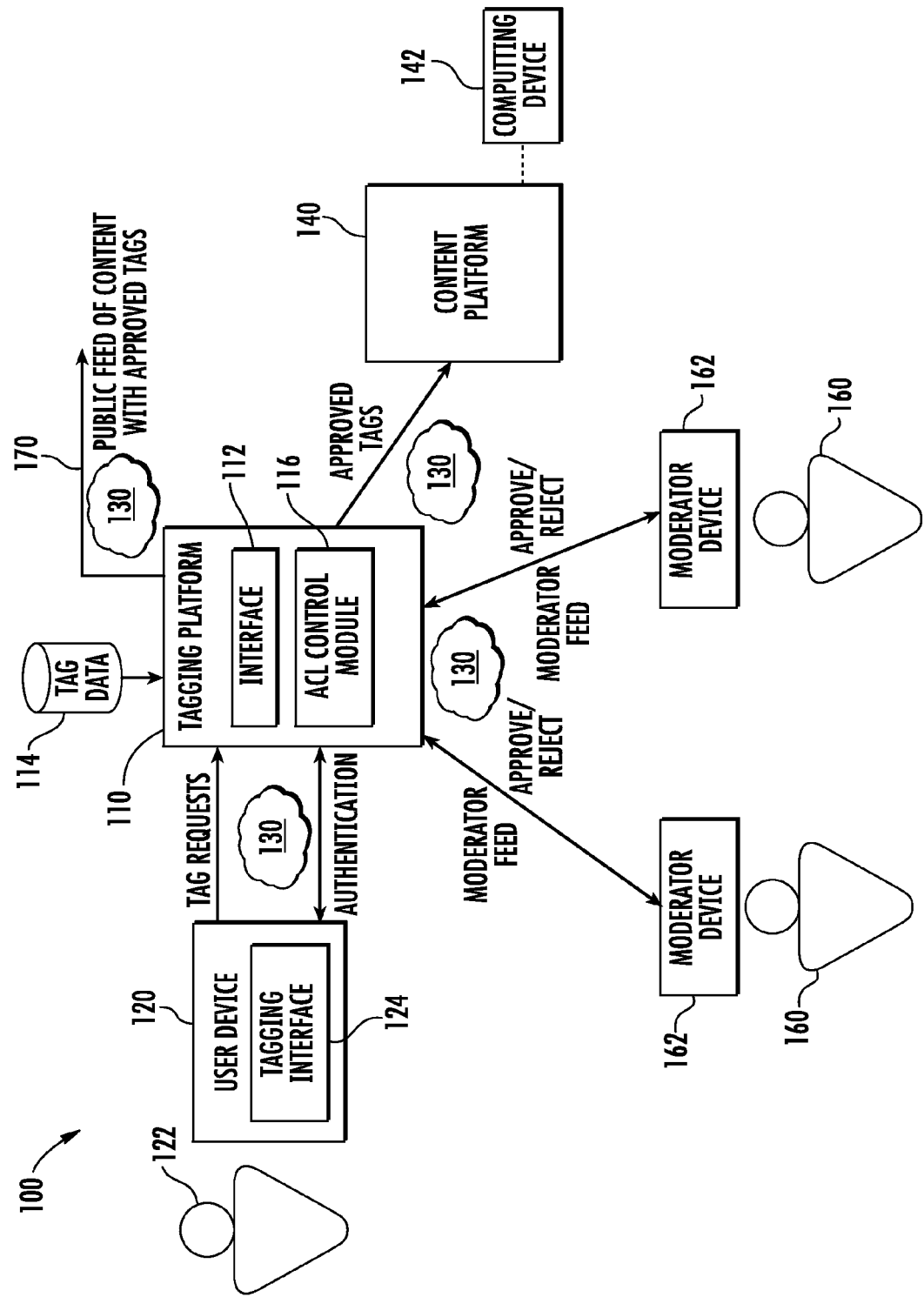
FIG. 1 illustrates a schematic diagram of one embodiment of a system for associating tags with online content in accordance with aspects of the present subject matter.

Reference now will be made in detail to embodiments, one or more examples of which are illustrated in the drawings. Each example is provided by way of explanation of the embodiments, not limitation. In fact, it will be apparent to those skilled in the art that various modifications and variations can be made to the embodiments without departing from the scope or spirit of the embodiments. For instance, features illustrated or described as part of one embodiment can be used with another embodiment to yield a still further embodiment. Thus, it is intended that the present subject matter cover such modifications and variations as come within the scope of the appended claims and their equivalents.

In general, the present subject matter is directed to systems and methods for associating tags with online content. Specifically, an access control list (ACL) based tagging system is provided that may be managed by tag groups that control the application of tags associated with specific online content objects. As such, the ACL-based tagging system may be used to create a workflow for managing content associated with one or more particular tags.

For example, in several embodiments, the ACL-based tagging system may include one or more controlled tags that are associated with one or more tag groups. A user may submit a tag request for tagging an online content object using a tagging interface on the user's device. The tagging system may check to see if the tag is a new tag or an existing tag. If the tag is a new tag, the tag may be created within the system and associated with the content object. If the tag is an existing tag, an ACL(s) associated with the tag may be accessed to determine if the tag is a controlled tag or a world-writable tag. If the tag is a world-writable tag, the tag may be associated with the content object. However, if the tag is a controlled tag, the user may be asked to login or provide any other suitable authentication information. The tagging system may then determine whether the user has access to the controlled tag by reviewing the ACL(s) associated with the controlled tag. If the user does not have access, the user may be informed that the tag is not available to the user.

When the user is permitted access to the controlled tag, the tag may be associated with the content object. Content objects tagged with the controlled tag may then be made available via a public feed, which may be used by others as trustworthy signal for the quality of the content objects associated therewith.

Additionally, in one implementation, the tagging system may also provide a feed of the content object to one or more moderators associated with the tag group for the controlled tag. The moderator(s) may, for example, have the ability to approve or reject the controlled tag. The moderator(s) may also have the ability to add additional tags to the content object (e.g., more restrictive tags). A feed may then be provided for all content objects associated with moderator-reviewed tags (including tags generated by the moderator(s)), which may be used by others as an even more trustworthy collection of online content.

Additionally, in several embodiments of the present subject matter, a user may gain access to a particular controlled tag based on a quality signal associated with the user. The quality signal may be based on the number and quality of the tags submitted by the user. For instance, if a user's tags were routinely removed by moderators, the quality signal may indicate that the user is not a trustworthy user. However, a user that generates many page views by finding great content and adding a tag (which is then used to navigate to that content) may have a quality signal indicating that the user is a trustworthy user. The quality signals associated with users may be used to select users that can access a particular controlled tag, to select users to become members of the tag group, and/or to select users to become moderators of the tag group.

As used herein, the term "content" generally refers to any information being consumed or otherwise made available to a user online and may include, but is not limited to, visual data, audio data and/or combinations thereof. An object, such as a web page, article, image, video clip, audio clip, 2-D map, 3-D globe, business, person and other objects, may be represented as a collection of content. Thus, the term "content object" generally refers to a specific piece or set of information associated with an object. Content objects may be viewable online through various mechanisms, such as through client software or any other suitable computer based application. Additionally, the term "tag" generally refers to a user-generated or user-selected content label and may include, but is not limited to, a text string associated with a content object. In other words, tags may be used as content identifiers and/or descriptors to identify/describe specific content objects, such as by tagging an image with a description of the contents of such image.

Additionally, it should be appreciated that the technology described herein makes reference to computing devices, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, computer processes discussed herein may be implemented using a single computing device or multiple computing devices working in combination. Databases and applications may be implemented on a single system or distributed across multiple systems. Distributed components may operate sequentially or in parallel.

Referring now to the drawings, FIG. 1 illustrates a schematic diagram of one embodiment of an ACL-based tagging system 100 for associating tags with online content. As shown, the system 100 may include a tagging platform 110 in communication with a computing device 120 over a network 130. The tagging platform 110 may be hosted by any suitable computing device(s), such as a web server(s). The computing device 120 may be any suitable computing device, such as a laptop, desktop, smartphone, tablet, mobile device, wearable computing device or any other computing device.

A user 122 may input a tag request into the computing device 122 via a suitable user interface, such as a tagging interface 124. The tag request may generally correspond to a request to associate a tag with a specific content object. For instance, the user 122 may submit a tag request to associate an image description with an image file, such as by submitting the tag "plane in flight" to identify the location of an airplane within a satellite image (e.g., satellite imagery available through Google Earth). The computing device 120 may then send the tag request to the tagging platform 110.

It should be appreciated that the content object associated with the tag request may be hosted by any suitable computing device. For instance, in several embodiments, the content object may be made available to the user 122 via a content platform 140 hosted by a remote computing device(s) 142, such as a web server(s). In general, the content platform 140 may be any suitable platform that provides a means for presenting or otherwise making available online content to users. For instance, content platforms may include those adapted for sharing images or videos, such as the platforms available through Google Earth, YouTube, Panoramio and/or the like, or for sharing any other suitable online content.

Figure 2:
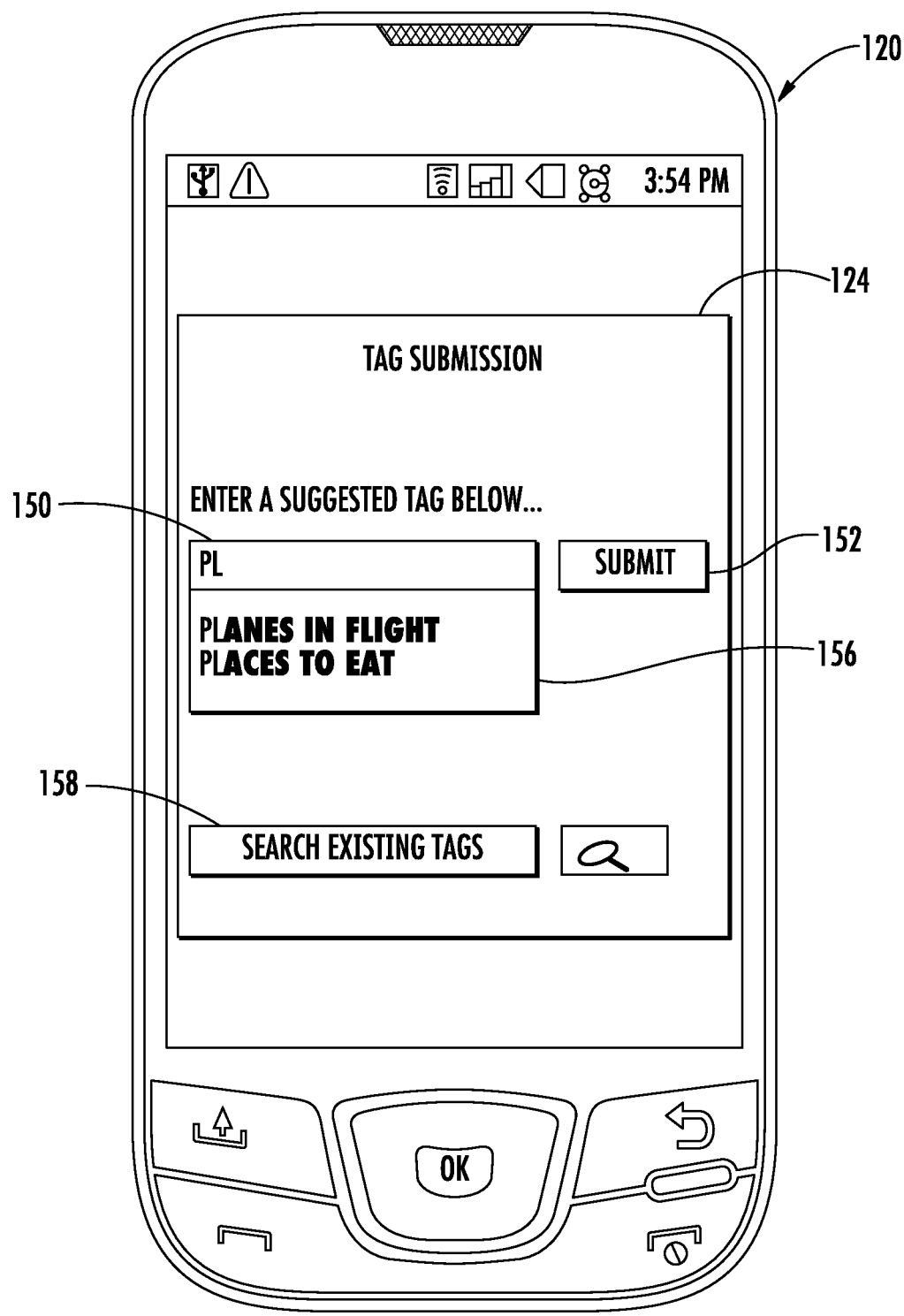
FIG. 2 illustrates one example of a tagging interface that may be presented to a user for submitting tag requests in accordance with aspects of the present subject matter.

It should be also appreciated that the tagging interface 124 presented to a user 122 may generally correspond to any suitable user interface that allows the user to generate, select and/or submit a tag request via his/her computing device 120. For instance, FIG. 2 illustrates one example of a suitable tagging interface 124 that may be displayed to a user 122 who desires to tag an online content object. As shown, the tagging interface 124 may include an input box 150 for inputting a suggested tag for the content object and a submit button 152 for transmitting the suggested tag to the tagging platform 110. For instance, the user may simply type the suggested tag into the input box 150 and click the submit button 152. Additionally, as shown in FIG. 2, a suggestion box 156 (e.g., a drop down menu) may be displayed to the user as he/she types. For example, the suggestion box 156 may display a list of existing tags provided by the tagging platform 110 based on the letter(s) input into the input box 150. Alternatively, the suggestion box 156 may provide suggestions of existing tags based on the particular content object being tagged. For instance, contextual information associated with the content object may be analyzed to provide suggestions for potential tags. Moreover, as shown in FIG. 2, the tagging interface 124 may also include a search box 158 that allows a user to input search queries to find pre-existing tags. In other embodiments, the tagging interface 124 may have any other suitable interface elements and/or may have any other suitable design/layout that permits a user to generate, select and/or submit a tag request.

Referring back to FIG. 1, the tagging platform 110 may be configured to receive the tag request from the computing device 120. For example, the tagging platform 110 may include a suitable network interface 112 for connecting to the network 130 and receiving the request. In response to the request, the tagging platform 110 may access tag data stored within a tag database 114. The tag data may include information associated with pre-existing tags, such as the content object(s), tag group(s) and/or ACL(s) associated with each tag. In addition, the tag database 114 may also be accessed by the tagging platform 110 to provide suggestions to the user for potential tags (as described above).

In several embodiments, the tagging platform 110 may implement an ACL control module 116 to review the suggested tag submitted by the user 122 in the tag request. For instance, the ACL control module 116 may be configured to initially check the tag database 114 to determine if the suggested tag already exists. If the tag is a new tag (and, thus, the tag does not match any pre-existing tags), the tag may be created within the system 100 and associated with the corresponding content object identified in the tag request. However, if the tag corresponds to a pre-existing tag, the ACL control module 116 may determine if any access restrictions or ACLs exist for the tag. If the tag is world-writable and, thus, is not subject to any access restrictions, the tag may be assigned to the particular content object. If the existing tag has an ACL(s) (such tag being referred to hereinafter as a "controlled tag"), the ACL control module 116 may generate an authentication request to determine whether the user 122 is permitted to access the controlled tag based on the set of permissions associated with the tag's ACL(s). For instance, the authentication request may require the user 122 to login using a username, password, email address and/or any other suitable identifier or to perform any other action that provides a means for identifying the user. If the user is allowed to access the controlled tag, the tag may be assigned to the particular content object associated with the user's tag request. However, if the user is not allowed access to the controlled tag based on the ACL(s), the user may be notified that the controlled tag is not available to him/her.

It should be appreciated that the ACL(s) for each controlled tag may generally include one or more permissions associated with accessing such tag. For instance, the ACL(s) may contain a list of approved users and, optionally, the rights associated with each user, such as by populating the ACL(s) with entries having [User ID, Role] pairs. In several embodiments, the list of approved users for a given controlled tag may generally correspond to a "tag group" for such tag, with each approved user being a member of the tag group. In such embodiments, the ACL(s) may specify the levels of access for each member of the tag group. For instance, the ACL(s) may restrict the access of some members (i.e., "tagging" members) to simply submitting tag requests for associating the controlled tag with a new content object. Alternatively, some members may be allowed to both submit tag requests and approve/reject the tag requests submitted by other members. As will be described below, such members are referred to herein as "moderators." In other embodiments, the ACL(s) for each controlled tag may have any other suitable set of permissions associated therewith and/or may have any suitable hierarchical structure. For instance, a controlled tag may include nested ACLs, such as by having one ACL for tagging members, one ACL for moderators and one ACL for all members (i.e., tagging members and moderators). Additionally, when a controlled tag includes multiple ACLs, a set of precedence rules may be applied to settle conflicts between ACLs. For instance, the most specific match for a given member of a tag group may control the access for such member.

Referring still to FIG. 1, as indicated above, each tag group may, optionally, have one or more moderators 160 that are given the ability to approve/reject tag requests submitted by members of the group. For instance, when a tag request is submitted for a given controlled tag, the tagging module 100 may generate a moderator feed of the content object associated with the tag request. The moderator feed may correspond to, for example, a web link to the content object on the content platform 140 hosted by the remote computing device 142. This moderator feed may then be transmitted or otherwise made available to one or more of the moderators 160 of the tag group. For instance, as shown in FIG. 1, the tagging module 110 may be in communication (e.g., via network 130) with a computing device 162 of each moderator 160. The computing device 162 may be any suitable computing device, such as a laptop, desktop, smartphone, tablet, mobile device, wearable computing device, or other computing device. By making available the moderator feed, the moderator(s) 160 may review the content object via his/her computing device 162 and subsequently assess the tag request submitted by the user. If the tag request is acceptable (e.g., the controlled tag is a suitable tag for the corresponding content object), the moderator 160 may approve the tag request. However, if the tag request is unacceptable (e.g., the controlled tag is not a suitable tag for the corresponding content object), the moderator 160 may reject the tag request. Additionally, each moderator 160 may also be given the ability to add one or more additional tags to the content object associated with the user's tag request (including replacing the tag associated with tag request with a new tag). For instance, a moderator 160, upon his/her review, may choose to add a more generic tag or a more specific tag to the content object.

In general, the moderator(s) 160 for each tag group may be selected in any suitable manner. However, in several embodiments, the moderator(s) 160 may be selected based on a quality signal associated with each member of the tag group. The quality signal assigned to each member may generally be based on the tagging history of the member (i.e., the previous tag requests submitted by the member) and/or the content views associated with the content objects tagged by the member. For instance, if a member's tag requests are routinely removed/rejected by the moderator(s) 160, the quality signal for such member may be relatively low/poor, thereby indicating that the member may not be a trustworthy source of accurate tags. In contrast, a member that routinely generates acceptable tag requests may have a quality signal that is relatively high/good, thereby indicating that the member is a trustworthy source of accurate tags. Members with high/good quality scores may then be selected or invited to become moderators 160 for the tag group.

It should be appreciated that the quality signals may also be used to select users to become members of a particular tag group. For instance, if a member of a first tag group has a high/good quality signal, such member may be asked to become a member of a second tag group. Additionally, assuming a user is not listed as an approved user in the ACL(s) for a particular controlled tag, an exception may be made to allow the user to gain access to the tag based on his/her quality signal. For instance, if the user's quality signal exceeds a predetermined threshold, the user may be granted temporary access to a controlled tag or the user may be added to the tag's ACL(s) and made a permanent member of the tag group associated with such tag.

Additionally, in several embodiments, the tagging platform 110 may be configured to provide a feed of the content objects having approved tags. For instance, as shown in FIG. 1, the tagging platform may provide a public feed 170 (e.g., a web link) of the content objects with approved tags. This feed may then be used by others (including individual users and third party sites) as a published collection of trustworthy online content. Moreover, as shown in FIG. 1, the tagging platform 110 may also be in communication with a content platform 140, such as the content platform hosting the content object(s) associated with the user's tag request. In such an embodiment, approved tags associated with the content objects hosted by the content platform 140 may be transmitted thereto from the tagging platform 110. The content platform 140 may then utilize the approved tags to organize its online content into specific collections/products or to otherwise enhance the user experience of the platform 140. For instance, the approved tags may be used in locating and navigating online content provided by the content platform 140, such as locating and navigating the geographic data available via geographic information systems, such as Google Earth, Google Maps and/or any other suitable geographic applications.

It should be appreciated that, in one embodiment, the tagging and content platforms 110, 140 may be hosted by separate computing devices, such as separate web servers. However, in other embodiments, both platforms 110, 140 may be hosted by the same computing device, such as a common web server. Additionally, although a single content platform 140 is shown in FIG. 1, the disclosed tagging system 100 may be used across multiple content platforms to allow for control of the application and promotion of tags associated with particular online content.

Figure 3:
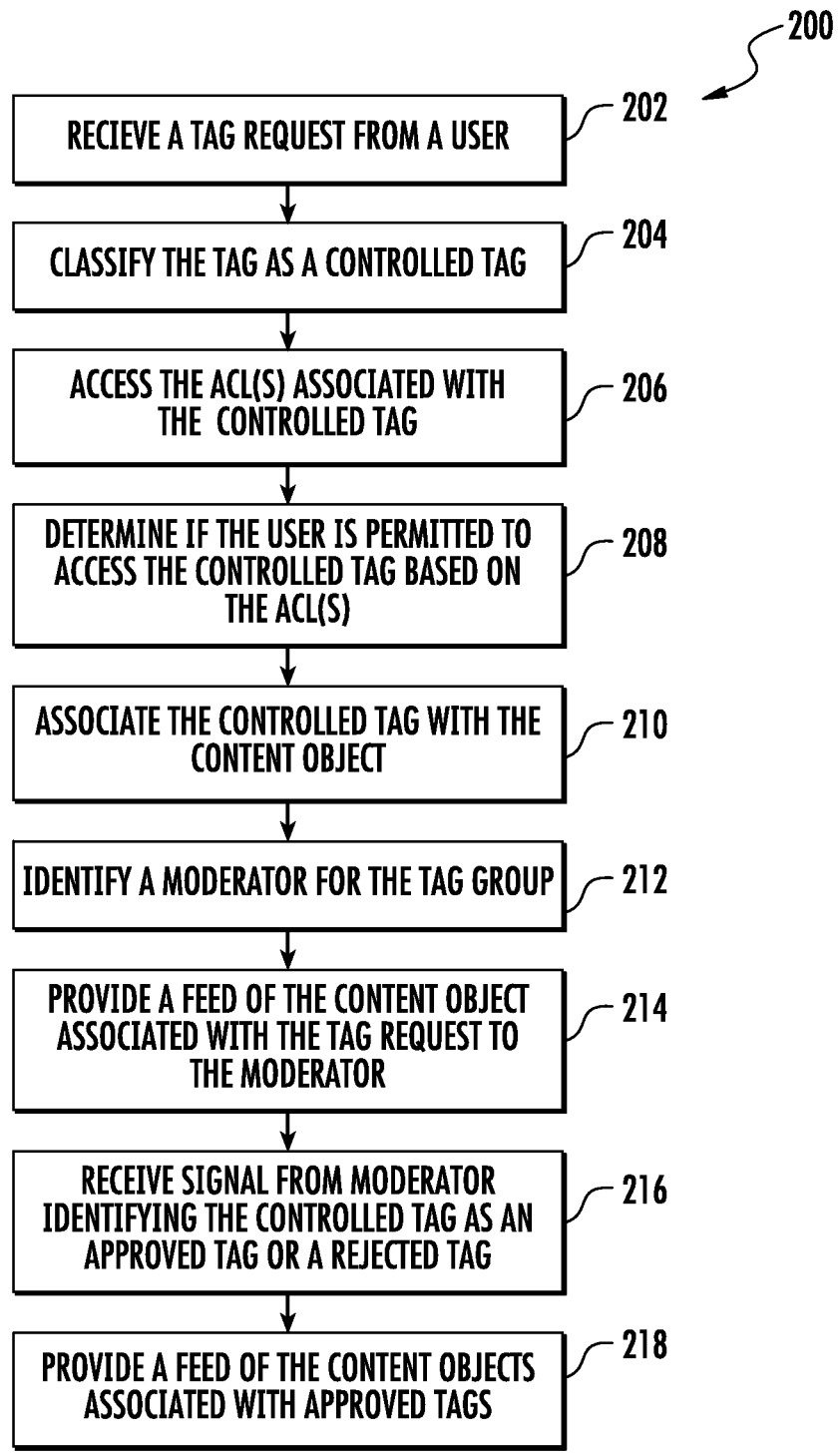
FIG. 3 illustrates a flow diagram of one embodiment of a method for associating tags with online content in accordance with aspects of the present subject matter.

Referring now to FIG. 3, a flow diagram of one embodiment of a method (200) for associating tags with online content is illustrated in accordance with aspects of the present subject matter. The method (200) may be implemented using any suitable computing device or system, such as the system 400 depicted in FIG. 5. In addition, FIG. 3 depicts method elements performed in a particular order for purposes of illustration and discussion. Those of ordinary skill in the art, using the disclosures provided herein, will understand that the various steps of any of the methods disclosed herein can be omitted, adapted, and/or rearranged in various ways.

At (202), the method (200) includes receiving a tag request from a user. For instance, the tagging platform 110 of FIG. 1 may be configured to receive a tag request from the user's device 120 over a network 130. As indicated above, the tag request may correspond to a request to associate a specific tag with an online content object. For example, the user may submit a tag request to associate a word or phrase with a particular content object, such as an image or video available on any suitable content platform 140.

As indicated above, once the tag request is received, the tagging platform 110 may be configured to implement an ACL control module 116 to determine if the tag associated with the user's tag request is new, world-writable or controlled. If the tag is new or world-writable, the tag is created and associated with the content object identified in the tag request. However, if the tag includes ACL(s), at (204), the tag is classified as a controlled tag. Specifically, as indicated above, each controlled tag may include one or more ACLs specifying a permission or set of permissions required for accessing the tag. For instance, the ACL(s) may contain a list of the users allowed to access the controlled tag (i.e., the members of the tag group associated with the tag) and the role or level of access provided to each approved user.

At (206), the method (200) includes accessing the ACL(s) associated with the controlled tag. For instance, the ACL control module 116 may have access to a tag database 116 that stores information associated with the controlled tag, including the tag's ACL(s). At (208), the ACL(s) may be referenced to determine whether the user is permitted to access the controlled tag. For example, as described above, an authentication request may be transmitted to the user requiring him/her to provide log-in information or other suitable information to authenticate his/her identity (e.g., an email address, username, password and/or the like). The information provided by the user may then be cross-referenced with the ACL(s) to determine if the user is permitted access to the tag. Assuming that the user is permitted access to the controlled tag (and, thus, is considered a member of the corresponding tag group), the tag may, at (210), be associated with the content object identified in the user's tag request. As indicated above, the content object may then be made available to the public via feed associated with the controlled tag. In addition to such feed, or as an alternative thereto, the content object may also be made available to one or more moderators for the tag group, as will be described below.

At (212 and 214), the method (200) includes identifying a moderator for the tag group associated with the controlled tag and providing a feed to the moderator of the content object identified in the user's tag request. For instance, as indicated above, the tagging platform 110 may be configured to transmit a moderator feed to one or more of the moderators for the tag group to provide the moderator(s) access to the associated content object. The moderator(s) may then review the content object to determine if it is appropriate to use the controlled tag with such content object. In addition, the moderator(s) may also choose to associate an additional tag(s) with the content object, such as a more general or more specific/restrictive tag.

At (216), the method (200) includes receiving a signal from the moderator(s) identifying the controlled tag as an approved tag or a rejected tag. Any rejected tags may be discarded from the system 100. However, for approved tags, at (218), the tagging platform 110 may provide a feed of the content objects associated with such tags. For instance, as indicated above, a public feed 170 may be made available and offered as trustworthy collection of the content objects. In addition, the approved tags may be transmitted to one or more content platforms 140 to allow such platform(s) to provide a trustworthy collection of content objects associated with each approved tag.

Figure 4:
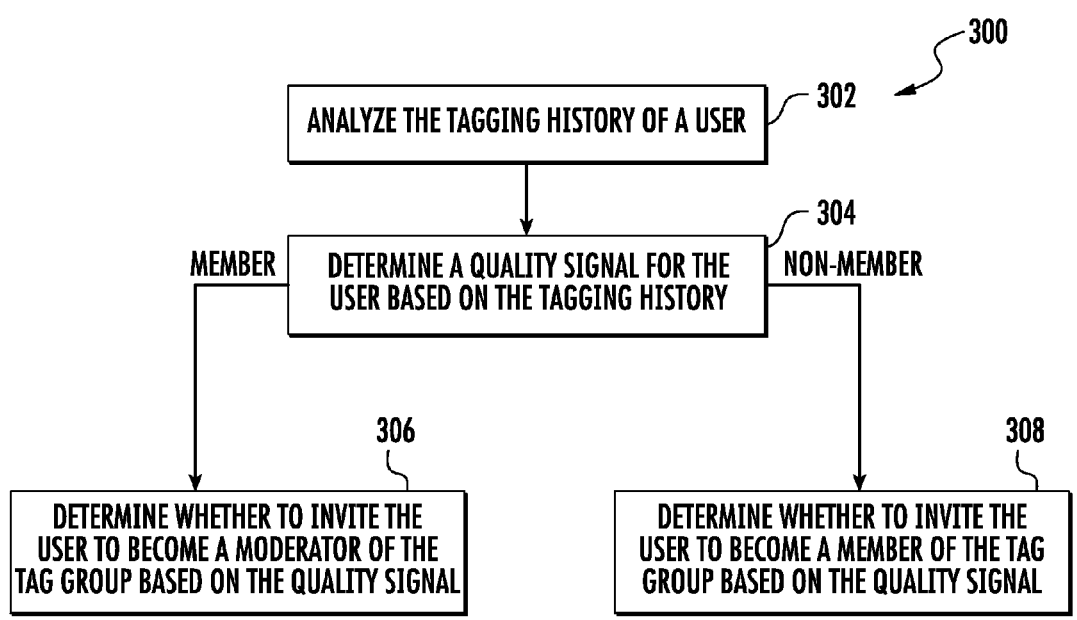
FIG. 4 illustrates a flow diagram of one embodiment of a method for assessing user quality based on a user's tagging history in accordance with aspects of the present subject matter.

Referring now to FIG. 4, a flow diagram of one embodiment of a method (300) for assessing user quality based on a user's tagging history is illustrated in accordance with aspects of the present subject matter. In general, the method (300) may be implemented using any suitable computing device or system, such as the system 400 depicted in FIG. 5 and may, in several embodiments, form part of the method (200) described above. Additionally, although FIG. 4 depicts method elements performed in a particular order, it should be appreciated that the method elements may generally be performed in any suitable order.

At (302 and 304), the method (300) includes analyzing the tagging history of a particular user and determining a quality signal for the user based on his/her tagging history. For instance, previous tag requests submitted by the user may be analyzed to determine whether such tag requests resulted in approved or rejected tags. A user with a large number of approved tags (or a high ratio of approved tags to rejected tags) may be assigned a high/good quality signal while a user with a small number of approved tags (or a low ratio of approved tags to rejected tags) may be assigned a low/poor quality signal. Additionally, the quality signal may also be based on the number of content views associated with the content objects tagged by the user. For instance, a user that generates many page views by finding great content and adding a tag (which is then used to navigate to that content) may be assigned a high/good quality signal.

If the particular user being assessed is already a member of a particular tag group, at (306), the method (300) may include determining whether to invite the user to become a moderator of the tag group based on his/her quality signal. For instance, if the quality signal indicates that the user is a trustworthy source of accurate tags, an invitation may be transmitted to the user requesting that he/she become a moderator of the group.

Additionally, if the particular user being assessed is not a member of a particular tag group, at (308), the method (300) may include determining whether to invite the user to become a member of the tag group. Again, if the quality signal indicates that the user is a trustworthy source of accurate tags, it may be appropriate to send an invitation to the user requesting that he/she become a member of the group.

Figure 5:
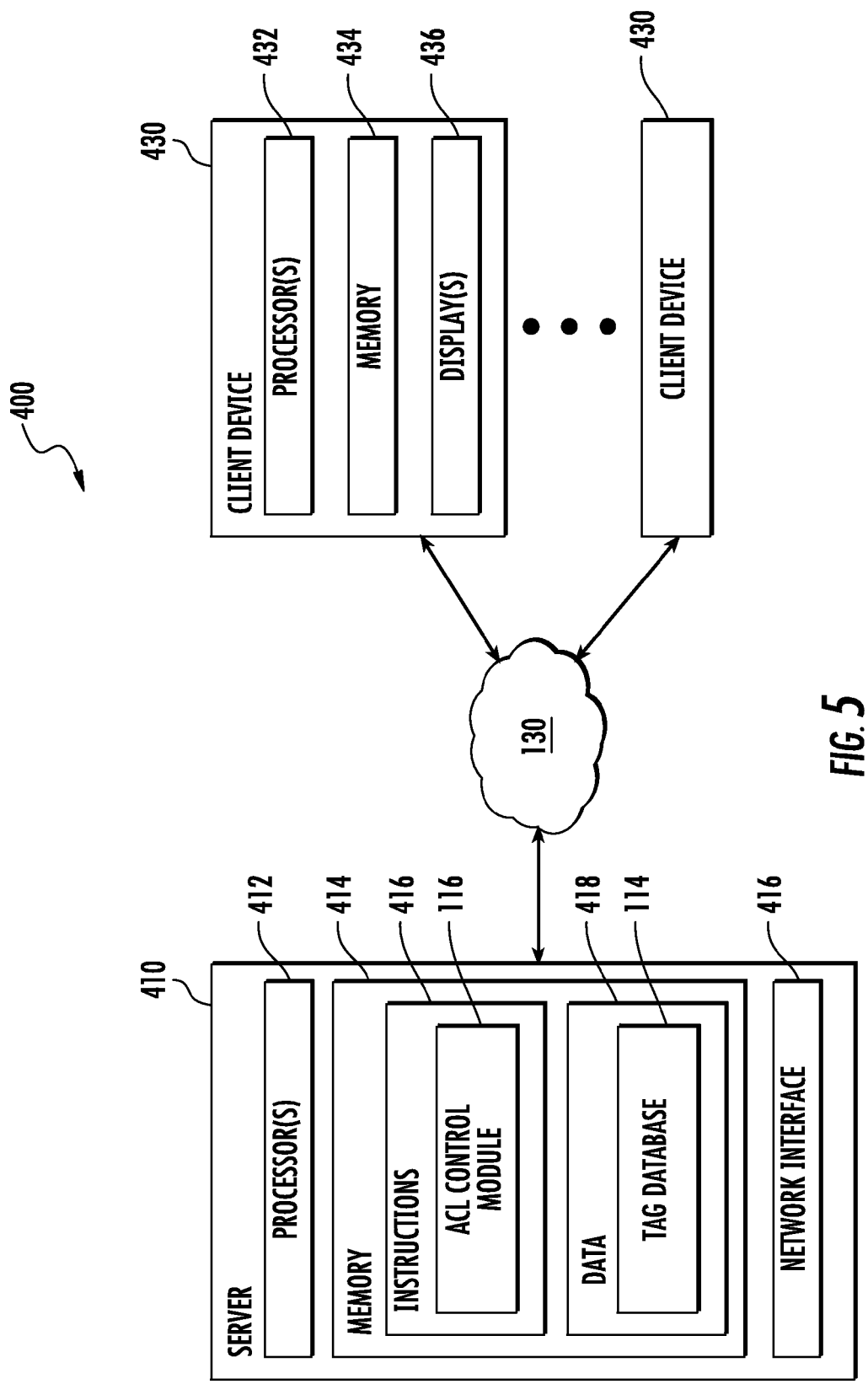
FIG. 5 illustrates a schematic diagram of one embodiment of a suitable computing system for associating tags with online content in accordance with aspects of the present subject matter.

Referring now to FIG. 5, a schematic diagram of one embodiment of a computing system 400 that may be used to implement the disclosed methods and systems for associating tags with online content is illustrated in accordance with aspects of the present subject matter. The system 400 has a client-server architecture that includes a server 410 that communicates with one or more client devices 430 over a network 130. The system 400 can be implemented using other suitable architectures, such as a single computing device.

The system 400 includes a server 410, such as a web server. The server 410 may be configured to host a tagging platform, such as the tagging platform 110 of FIG. 1, and/or a content platform, such as the content platform 130 of FIG. 1. The server 410 may be implemented using any suitable computing device(s). Additionally, as shown in FIG. 5, the server 410 may have a processor(s) 412 and a memory 414. The server 410 may also include a network interface 416 used to communicate with one or more remote computing devices (e.g. client devices 430) over the network 130.

The processor(s) 412 may be any suitable processing device, such as a microprocessor, microcontroller, integrated circuit, or other suitable processing device. The memory 414 may include any suitable computer-readable medium or media, including, but not limited to, non-transitory computer-readable media, RAM, ROM, hard drives, flash drives, or other memory devices. The memory 414 may store information accessible by processor(s) 412, including instructions 416 that can be executed by processor(s) 412. The instructions 416 may be any set of instructions that when executed by the processor(s) 412, cause the processor(s) 412 to provide desired functionality. For instance, the instructions 416 may be executed by the processor(s) 412 to implement an ACL control module 116 or any other suitable modules.

It will be appreciated that the term "module" refers to computer logic utilized to provide desired functionality. Thus, a module may be implemented in hardware, application specific circuits, firmware and/or software controlling a general purpose processor. In one embodiment, the modules are program code files stored on the storage device, loaded into memory and executed by a processor or can be provided from computer program products, for example computer executable instructions, that are stored in a tangible computer-readable storage medium such as RAM, ROM, hard disk or optical or magnetic media.

The memory 414 may also include data 418 that can be retrieved, manipulated, created, or stored by processor(s) 412. The data 418 may be stored in one or more databases, such as a tag database 114 configured to store tag data. The database(s) may be connected to the server 410 by a high bandwidth LAN or WAN, or may also be connected to the server 410 through the network 130.

The server 410 may exchange data with one or more client devices 430 over the network 130, such as the user devices 120 and/or moderator devices 162 of FIG. 1. Although two clients 430 are illustrated in FIG. 5, any number of client devices 430 can be connected to the server 410 over the network 130. As indicated above, the client devices 430 may be any suitable type of computing device, such as a general purpose computer, special purpose computer, laptop, desktop, integrated circuit, mobile device, smartphone, tablet, wearable computing device, or other suitable computing device.

Similar to the computing device 410, the client device 430 may include a processor(s) 432 and a memory 434. The memory 434 may store information accessible by processor(s) 432, including instructions that may be executed by processor(s) 432 and data. The client device 430 may also include various input/output devices for providing and receiving information from a user, such as a touch screen, touch pad, data entry keys, speakers, and/or a microphone suitable for voice recognition. For instance, as shown in FIG. 5, the computing device 430 may include a display 436 for presenting user interfaces to the user, such the tagging interface 124 of FIGS. 1 and 2.

The network 130 may generally be any type of communications network, such as a local area network (e.g. intranet), wide area network (e.g. Internet), or some combination thereof. The network 120 may also include a direct connection between a client device 430 and the server 410. In general, communication between the server 410 and a client device 430 may be carried via a network interface using any type of wired and/or wireless connection, using a variety of communication protocols (e.g. TCP/IP, HTTP, SMTP, FTP), encodings or formats (e.g. HTML, XML), and/or protection schemes (e.g. VPN, secure HTTP, SSL).

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method of associating tags with online content, the method comprising:
receiving, by one or more computing devices, a tag request from a user to associate a tag with a content object;
classifying, by the one or more computing devices, the tag as a controlled tag;
accessing, by the one or more computing devices, an access control list associated with the controlled tag, the access control list specifying at least one permission required to access the controlled tag;
determining, by the one or more computing devices, whether the user is permitted access to the controlled tag based on the access control list;
when the access control list permits access to the controlled tag, associating, by the one or more computing devices, the tag with the content object;
identifying, by the one or more computing devices, a moderator for a tag group associated with the controlled tag; and
providing, by the one or more computing devices, a moderator feed to the moderator of the content object associated with the controlled tag;
wherein the method further comprises generating, by the one or more computing devices, a quality signal for the user based on a tagging history of the user; and determining, by the one or more computing devices, whether to invite the user to become a member of the tag group based on the quality signal.

2. The method of claim 1, further comprising receiving, by the one or more computing devices, a signal from the moderator identifying the controlled tag as an approved tag or a rejected tag.

3. The method of claim 2, further comprising providing, by the one or more computing devices, a feed of content objects associated with approved tags.

4. The method of claim 1, further comprising receiving, by the one or more computing devices, a signal from the moderator identifying a new tag to be associated with the content object.

5. The method of claim 1, further comprising transmitting, by the one or more computing devices, the approved tag to a content platform associated with the content object.

6. The method of claim 1, wherein the quality signal is based on a number of approved tags associated with the user.

7. The method of claim 1, further comprising determining, by the one or more computing devices, whether to invite the user to become a moderator for the tag group based on the quality signal.

8. The method of claim 1, further comprising transmitting, by the one or more computing devices, an authentication request to the user in response to the tag request.

9. The method of claim 1, wherein the content object is hosted at a remote computing device.

10. The method of claim 9, wherein the moderator feed comprises a link to the content object hosted at the remote computing device.

11. A system for associating tags with online content, the system comprising:
one or more computing devices including one or more processors and at least one memory, the at least one memory storing instructions that, when executed by the one or more processor, configure the one or more computing devices to:
receive a tag request from a user to associate a tag with a content object;
classify the tag as a controlled tag;
access an access control list associated with the controlled tag, the access control list specifying at least one permission required to access the controlled tag;
determine whether the user is permitted access to the controlled tag based on the access control list;
associate the tag with the content object when the access control list permits access to the controlled tag;
identify a moderator for a tag group associated with the controlled tag; and
provide a moderator feed to the moderator of the content object associated with the controlled tag;
wherein the one or more computing devices are further configured to generate a quality signal for the user based on a tagging history of the user; and the one or more computing devices are configured to determine whether to invite the user to become a member of the tag group based on the quality signal.

12. The system of claim 11, wherein the one or more computing devices are further configured to receive a signal from the moderator identifying the controlled tag as an approved tag or a rejected tag.

13. The system of claim 11, wherein the one or more computing devices are further configured to provide a feed of content objects associated with approved tags.

14. The system of claim 11, wherein the one or more computing devices are further configured to receive a signal from the moderator identifying a new tag to be associated with the content object.

15. The system of claim 11, wherein the one or more computing devices are configured to determine whether to invite the user to become a moderator for the tag group based on the quality signal.

16. The system of claim 11, wherein the one or more computing devices are further configured to transmit an authentication request to the user in response to the tag request.

* * * * *